UNITED STATES PATENT OFFICE.

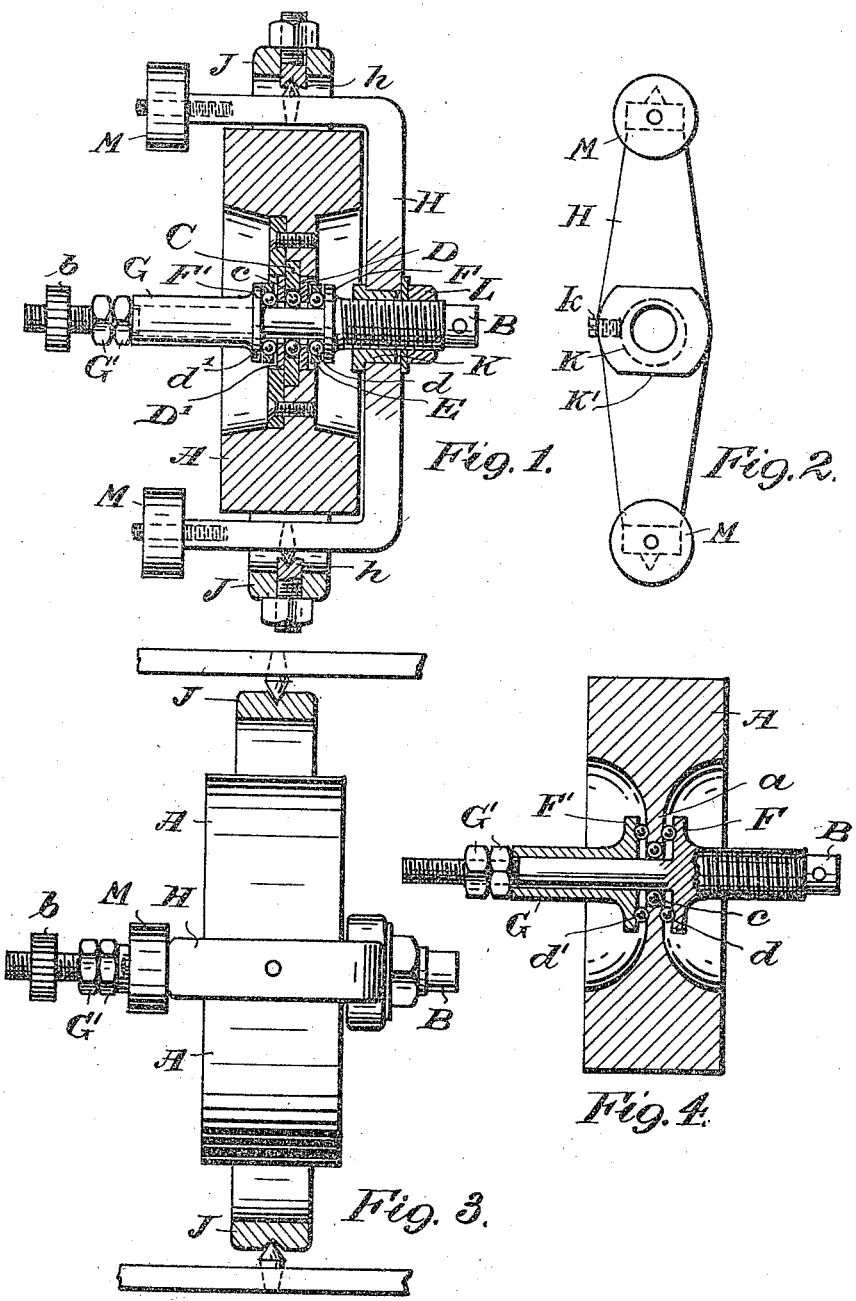

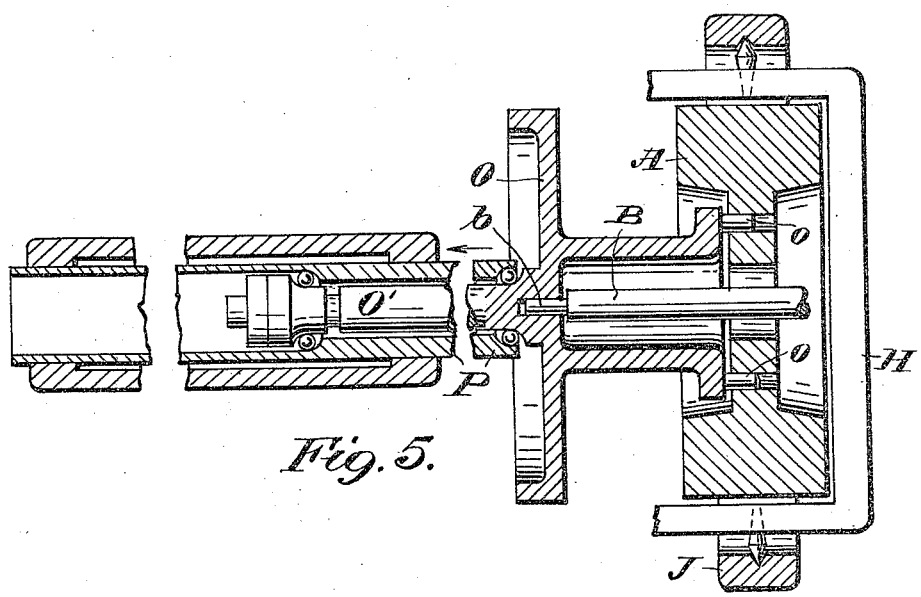

JOHN GARDNER, OF KNOTT END, NEAR FLEETWOOD, ENGLAND.

GYROSCOPE.

1,136,666.   Specification of Letters Patent.   Patented Apr. 20, 1915.

Application filed May 5, 1914. Serial No. 836,393.

*To all whom it may concern:*

Be it known that I, JOHN GARDNER, a subject of the King of Great Britain and Ireland, and a resident of Knott End, near Fleetwood, in the county of Lancaster, England, have invented new and useful Improvements in Gyroscopes, of which the following is a specification.

I have described a construction of gyroscope in which the wheel is mounted upon an axle which can be longitudinally or axially adjusted within a rotatable bush which is eccentrically mounted about the axis of the axle, and as described in the specification to my prior British Letters Patent No. 20135 of 1912 the bearing of the wheel consists of a single row of balls centrally disposed therein. It is to improvements in the construction of such a gyroscope wheel containing such a single centrally disposed row of balls, and mounted upon an axle which is axially adjustable in a rotary bush mounted eccentrically about the axis of the axle that my present invention relates. With the described construction, the accurate adjustment of the gyroscope wheel relatively to its frame may be effected, but complete accuracy in running is not always attained as the wheel is capable of slight axial motion relatively to its axle, and this slight axial motion, as well as being prejudicial to absolute accuracy in the running of the gyroscope, also makes it impossible to true up the wheel while it is running on its own axle and bearing.

The object of the present invention is to attain absolute accuracy in the running of the gyroscope as permitted by the employment of the axial and eccentric adjusting devices, by providing means which prevent the indicated axial motion of the wheel and which will permit the wheel to be trued up while running on its own axle and bearing.

In the improved gyroscopic wheel constructed according to this invention there is a single row of balls centrally disposed to run around a stationary horizontal or approximately horizontal axle. Such a single row of balls will be hereinafter referred to as a single journal bearing. In addition there are end or thrust bearings preferably consisting of two extra rows of balls which are placed in planes parallel to and one on each side of the plane of the single journal bearing and are adapted to engage with convenient parts of the wheel or accessories thereto in order to prevent its endwise motion on the axle. Such thrust bearings take no part or very little part in bearing the weight of the wheel.

The accompanying drawings illustrate two forms of bearings constructed to embody my present improvements and also illustrate how the axle is held and may be adjusted. They are to be considered simply as examples.

Figure 1 is a horizontal sectional view of a gyroscope wheel and its bearing and stationary horizontal axle, the latter being held by one end only in the inner gimbal. Fig. 2 is an end view of this inner gimbal. Fig. 3 is a view partly in side elevation and partly in vertical section of the parts shown in Fig. 1. Fig. 4 is a sectional view of a wheel and axle having a bearing of modified construction and disposition. Fig. 5 illustrates how a locking and spinning appliance may be combined with a wheel mounted as shown in Figs. 1 to 3.

Like letters of reference are used to indicate like parts where they occur in the different drawings.

Referring first to Figs. 1, 2 and 3, A is the gyroscope wheel mounted so as to revolve around the stationary axle B. C is a central ball race consisting of a hard steel ring which is centrally clamped within the wheel. Contained within the steel ring C is a single row of balls $c$ which run around and upon the axle B. The points of contact between the balls and the ring C and the axle B are all contained within or practically within a single plane which is coincident with a plane taken centrally through the mass of the wheel at right angles to its axis, and the bearing formed by the ring C, the single row of balls $c$ and the axle B is a single journal bearing. This bearing carries the whole or very nearly the whole of the weight of the wheel. D D¹ are hard steel washers placed to fit within the eye of the wheel A so as to rotate with the wheel. They are bored to a larger diameter than the diameter of the axle. They fit flush against the sides of the ring C and then just leave room for the balls $b$ of the single journal bearing to rotate between them. The outer faces of the rings D $D^1$ abut against rows of balls $d$ $d^1$ also adapted to run around the axle B. These rows of balls may be contained in cages, but are preferably within encircling rings E and between the washers D $D^1$ and flanges F $F^1$ on the axle. One flange F is integral with the axle; the other $F^1$ is on a bush G which slides on the axle and can have its position thereon varied by means of lock nuts $G^1$ $G^1$ engaging with the screwed end of the axle. The bearings formed by the washers D $D^1$, the balls $d$ $d^1$ and the flanges F $F^1$ form thrust bearings which prevent axial movement of the wheel A, while they do not bear its weight and leave it free to rotate on the central single journal bearing. One end of the axle B is carried in an open ended frame H which acts as the ordinary inner gimbal of a gyroscope and is pivoted at $h$ $h$ to the outer gimbal J. The devices illustrated permit both axial and transverse adjustment to be given to the axle B and the wheel A. The end of the axle B is screwed eccentrically into a cylindrical bush K. This bush is mounted in a hole in the gimbal H so that it can be rotated therein. $K^1$ is a head by which the bush can be rotated. $k$ is a set screw by which the bush is prevented from turning too freely in the gimbal H. L is a nut screwing on the end of the axle against the gimbal H. The bush K is shorter than the thickness of the gimbal, so when the nut L is screwed up the bush is locked in place in the gimbal. When the nut L is loosened the axle B can be turned in the bush K so as to move the axle and wheel axially relatively to the gimbal H and bush K, and the bush K can be turned angularly so as to move the axle and wheel transversely relatively to the gimbal. By these adjusting devices the position of the wheel and of the axle relatively to the axis of the pivots $h$ $h$ may be adjusted as desired so that the axis of rotation of the wheel can be brought to intersect the axis of the pivots or be disposed slightly above or below it. For absolute balance and quiet running of the wheel in a vertical plane the two axes should intersect, and the central transaxial plane of the wheel and the plane of the central bearing should also pass through the axis of the pivots. $b$ is an adjustable counterbalance weight on the end of the axle. M M are weights on the ends of the open gimbal H.

A modification of the bearing is shown in Fig. 4. In this the balls $d$ $d^1$ of the thrust bearings bear directly against the face of a central fin or web $a$ of the wheel and they are disposed in shallow grooves which form circles of greater diameter than the diameter of the central single journal bearing. These grooves are formed in the faces of the web $a$ and in the inner faces of the flanges F $F^1$.

Fig. 5 shows how an air turbine may be employed to spin the wheel. O is an air turbine wheel secured to the shaft $O^1$ which rotates in the sleeve P. This sleeve can be longitudinally moved carrying the shaft and wheel with it. When the turbine wheel is in the position shown in Fig. 5 an axial extension of it enters between the open ends or sides of the gimbal H, receives axially within itself the end $b^1$ of the axle B, and by means of pins $o$ $o$ engages with holes in the face of the wheel A. When the turbine wheel O is rotated it rotates around the end $b$ of the axle and spins the wheel. When sufficient velocity has been imparted to the gyroscope wheel the sleeve P is moved in the direction of the arrow and withdraws the turbine wheel and its accessories from the axle B and wheel A, leaving the gyroscope free.

Any other convenient means and devices for spinning the gyroscope wheel and for locking its axle in place during such spinning may be adopted. For example vanes may be formed on the wheel A and air under pressure may be conducted through the axle so as to escape through suitable perforations and to impinge on such vanes and drive the wheel.

What I claim is:—

1. In a gyroscope, a gimbal frame, a stationary axle adjustably carried thereby, a gyroscopic wheel supported on said axle, a bearing interposed between said axle and wheel consisting of a single row of balls lying in a fixed plane perpendicular to the axis of said axle and passing through the center of inertia of said wheel, a row of balls arranged on each side of said central row, and races for the balls, one of said races being carried by each of the side faces of said wheel and the others of said races being supported on said axle, the wearing faces of said races being in parallelism with the fixed plane aforesaid whereby the mass particles of said wheel are forced to rotate in exact parallelism with said fixed plane.

2. In a gyroscope, a gyroscopic wheel, a stationary axle therefor, a gimbal frame, an adjustable eccentric support carried by said frame into which one end of said axle is threaded, the other end of said axle being free, a bearing interposed between said axle and wheel, consisting of a single row of balls lying in a fixed plane perpendicular to the axis of said axle and passing through the center of inertia of said wheel, a row of balls arranged on each side of said central row, races for said balls, one of said races being carried by each side face of said wheel and the other of said races being supported on said axle, the wearing faces of said races being in exact parallelism with the fixed plane aforesaid whereby the gyroscopic wheel may be adjusted to a nicety both longitudinally and transversely of said frame, and the mass particles of said wheel forced to rotate in exact parallelism to said fixed plane.

In witness whereof I have hereunto set my hand in the presence of two subscribing witnesses.

JOHN GARDNER.

Witnesses:
 FREDERICK STANLEY PLANT,
 FRED COWERL.